May 26, 1942.     W. J. HALL     2,284,422
MOLDING
Filed Aug. 8, 1938
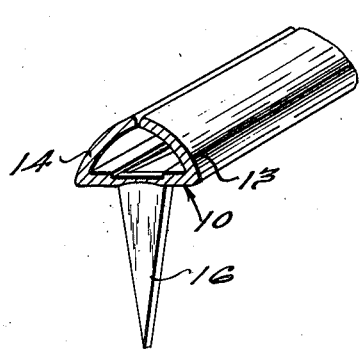
Fig. 1.
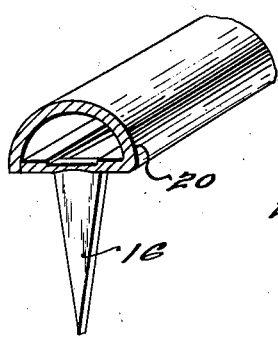
Fig. 2.
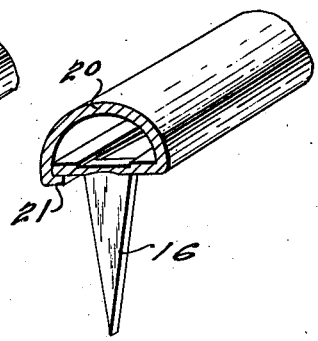
Fig. 3.
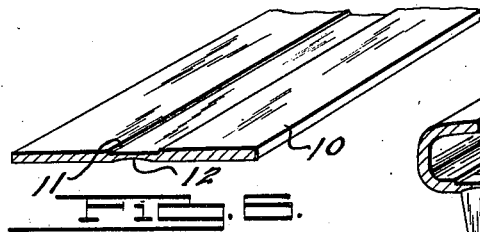
Fig. 6.
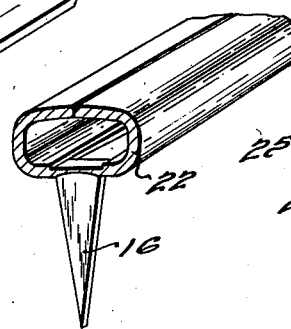
Fig. 4.
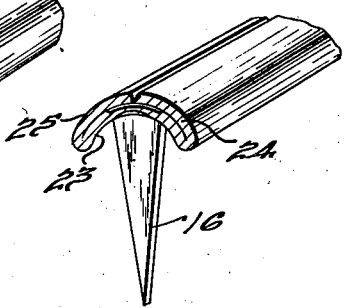
Fig. 5.
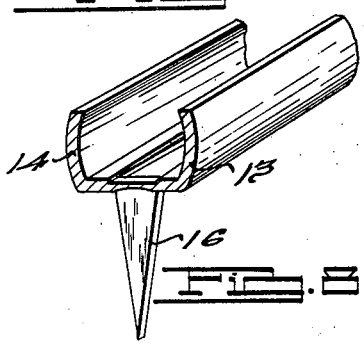
Fig. 8.
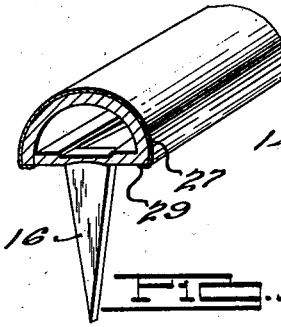
Fig. 9.
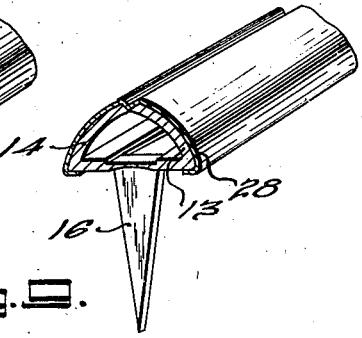
Fig. 10.
Fig. 7.
Fig. 11.
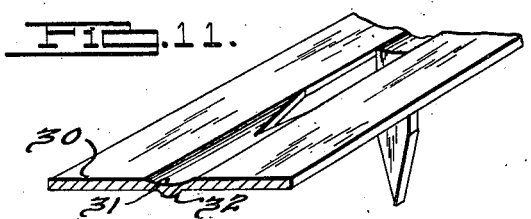
INVENTOR
William J. Hall
BY Harness, Dickey & Pierce
ATTORNEYS Patented May 26, 1942

2,284,422

UNITED STATES PATENT OFFICE 2,284,422

MOLDING

William J. Hall, Detroit, Mich., assignor to Herron-Zimmers Moulding Company, Detroit, Mich., a corporation of Illinois Application August 8, 1938, Serial No. 223,594

2 Claims. (Cl. 20—74)

The invention relates generally to moldings, and it has particular relation to molding for use on automobiles or the like for ornamental purposes.

In certain respects the invention constitutes an improvement over that embodied in my co-pending application for patent, Serial No. 185,811, filed January 20, 1938. In that application for patent, a molding is disclosed which comprises an inner base member having integral prongs struck therefrom for the purpose of attaching the base to a support, and an ornamental and covering strip which is disposed over the base in concealing relation to the prong openings. That disclosure also includes a particular means for reinforcing or stiffening the prongs while still providing for manufacture of the base member from inexpensive sheet metal.

One object of the present invention is to provide an improved molding having integral, struck-out prongs, which may be manufactured less expensively due to reduction in cost of materials and cost of manufacturing operations.

Another object of the invention is to provide a molding such as generally mentioned, wherein a thinner base member may be employed without undesirably sacrificing strength and stiffness in the prongs struck therefrom.

And, in general, it is an object of the invention to provide a molding which may be manufactured rapidly and with fewer manufacturing operations, while still providing a molding having a fine ornamental appearance and one which may be readily attached to a support or surface to which the molding is applicable.

Other objects of the invention will become apparent from the following specification, from the drawing to which it relates and from the claims hereinafter set forth.

For a better understanding of the invention, reference may be had to the drawing, wherein:

Figure 1 is a fragmentary view, in perspective, illustrating molding constructed according to one form of the invention;

Fig. 2 is a similar view illustrating another form of the invention;

Fig. 3 is a similar view illustrating still another form of the invention;

Fig. 4 illustrates a form of the invention on the order of Fig. 1, wherein the molding has a different contour;

Fig. 5 illustrates a laminated type of molding constructed according to one form of the invention;

Figs. 6, 7, and 8 are illustrative of steps that may be employed in manufacturing molding such as shown by Fig. 1, as an example;

Figs. 9 and 10 illustrate respectively, molding such as shown by Figs. 2 and 1, wherein a thin ornamental covering is applied to the exterior of the molding; and Fig. 11 is a view on the order of Fig. 6 illustrating a different form of member from which the prongs are struck, wherein the form adds strength to the prongs and reduces the thickness of metal required.

Referring first to Figs. 6, 7, and 8, and particularly to Fig. 6, a metal strip 10 is provided and this may comprise, for example, either a hot or cold rolled steel malleable character to permit shaping thereof by passing the strip between shaping rollers. The upper side of the strip has a shallow groove 11 generally of channel shape, while the lower side has a laterally arcuate and shallow groove 12 generally in alignment with the upper groove 11. These grooves are formed by passing the strip between rollers and as has been pointed out in the copending application for patent above mentioned, formation of the grooves also strengthens the metal due to the cold working thereof. It may be pointed out also that the thinned section obtains a sharper point on the prongs to be struck therefrom.

In contrast to the aforementioned co-pending application for patent, the strip 10 has a greater width, and in forming the molding shown by Fig. 1 the side edge portions are turned upwardly as indicated at 13 and 14 and brought into edge engagement. Either while the strip 10 is in flat form, or after the edge portions 13 and 14 are bent into the positions shown by Fig. 7, integral prongs 16, shown by Fig. 8, are struck from the strip along the recessed portion thereof. The particular manner in which these prongs are struck from the strip is also disclosed in detail in such co-pending application for patent.

It is thus apparent that a simple molding may be manufactured in the form shown by Fig. 1, by using a single strip of metal, that the molding thus provided has integral attaching prongs and it is characterized by a reduced cost of manufacture. Although different metals might be employed in making this molding so as to obtain, for example, a non-tarnishable ornamental surface, it is contemplated that it may be coated with a lacquer or suitable material that may be applied to the molding in a plastic or liquid state and which thereafter solidifies. Thus, various ornamental appearances may be obtained by using various lacquers or paints to obtain the desired ornamentation.

In both of the forms of molding shown by Figs. 2 and 3, the prong portion is located near one edge of the metal strip, and then the other edge portion of the strip is bent or turned into covering relation as indicated at 20. Fig. 3, while similar to Fig. 2, provides a short inturned flange 21 on the free edge of the strip which is locked under the edge of the flat or base portion of the strip. Either type of molding may be similarly covered with a lacquer or the like.

The structure shown by Fig. 4 is similar to Fig. 1 excepting that the shape of the molding is generally oval as indicated at 22. In Fig. 5, the side portions and base portion from which the prongs are struck are brought into contacting, laminated relation, as indicated at 23, 24, and 25. Additionally, the laminated structure is arcuate laterally so that when this molding is finally applied, its external appearance is similar to that shown by Fig. 2. It will be observed, that the laterally curved design increases the strength of the section and that greater pressure could be applied to the outer side when the prongs are to be clinched to a support to which the molding is to be applied.

Directing attention to Figs. 9 and 10, which show molding generally of the type shown by Figs. 2 and 1 particularly, these structures differ from the last figures in that a separate covering member is applied. In Fig. 9 this covering member is indicated at 27 and in Fig. 10 it is indicated at 28. Such a covering member may comprise thin stainless steel having short flanges 29 at its edges that interlock with the underside of the edge portions of the molding or the covers may comprise a lacquer coated on the molding. Additionally, the cover member may comprise a thin solidified plastic material which may be applied to the molding by pressure until the short flanges snap under the edges of the molding.

Now directing attention to Fig. 11, a strip 30 is provided and it will be understood that this strip may be employed in fabricating any of the moldings previously considered. The difference between this strip and that shown by Fig. 6 is that a laterally arcuate and shallow groove 31 is formed in the upper side of the strip and a bead 32 is formed on the lower side of the strip. This bead is not as wide as the groove 31 and its radius of curvature is less, and in the region of the bead the metal is thicker than that of the flat side portions of the strip. The formation of the groove and bead may be effected by passing the strip between forming rollers, and it will be appreciated that the metal is cold worked by this process and thus a reinforced or stronger metal is obtained for forming the prongs. A particular advantage of this structure is that the strip may be made of thinner stock while still obtaining the desired thickness and strength of prongs. Prongs are struck from the molding in this structure generally in the same manner previously described and disclosed in my co-pending application for patent, although the form and shape of the prongs will be varied owing to the shape of the recess 31 and the bead 32. Thus, the side edges of the prongs are thinner relative to the intermediate bead portion of the prongs.

All forms of the invention illustrated and described are designed to enable producing a molding at a reduced expense. When it is considered that millions of feet of molding of this general type are employed for ornamental purposes chiefly in the manufacture of automobiles, variations which enable obtaining even a slight reduction in cost become considerably important. Designs which enable employing a thinner metal without undesirably sacrificing strength in the attaching prongs have become highly desirable owing to reduction in the amount of metal required. Likewise, designs which enable elimination of parts are of value, since manufacturing operations are simplified and since also less metal is necessitated.

It is to be understood that any of the moldings disclosed may be manufactured by employing the process generally considered in the copending application for patent mentioned. By this is meant that the strip may be formed with the prong-strengthening recesses and/or beads, the prongs then struck from the metal and then the side portions of the strip bent into the shape or shapes indicated. Any one of the moldings illustrated thus may be manufactured by passing a strip through machines adapted to perform the several operations required in sequence. Thus it is intended that any one of the moldings may be manufactured by taking a flat strip of metal and passing it between rollers to form the recesses and/or bead, then forming the prongs, and then shaping the molding to obtain the finished product.

Although more than one form of the invention has been illustrated and described in detail, it will be apparent to those skilled in the art that various modifications may be made without departing from the scope of the appended claims.

What is claimed is:

1. A molding comprising an elongated base having its central, longitudinally extending portion of increased strength relative to other portions, integral prongs struck from the central part of the base and projecting from one side thereof, and a cover portion integral with the base at one edge thereof and which is bent over the opposite side of the base for the purpose of providing a cover element for said opposite side.

2. A molding comprising an elongated base having its central, longitudinally extending portion of increased strength relative to other portions, integral prongs struck from the central part of the base and projecting from one side thereof, a portion integral with the base at one edge thereof and which is bent over the opposite side of the base in covering relation to the prong openings, and a relatively thin cover member extending over said integral portion and having its edges engaging under the edges of the base.

WILLIAM J. HALL.